US006193207B1

(12) United States Patent
Umberg

(10) Patent No.: US 6,193,207 B1
(45) Date of Patent: Feb. 27, 2001

(54) CONFORMAL SECURITY DEVICE

(75) Inventor: John R. Umberg, Diamond Bar, CA (US)

(73) Assignee: Business Machine Security, Inc., Brea, CA (US)

( * ) Notice: Subject to any disclaimer, the term of this patent is extended or adjusted under 35 U.S.C. 154(b) by 0 days.

(21) Appl. No.: 09/352,470

(22) Filed: Jul. 14, 1999

(51) Int. Cl.[7] .......... F16M 13/00
(52) U.S. Cl. .......... 248/551; 78/58; 248/205.3
(58) Field of Search .......... 248/551, 552, 248/553, 686, 205.3; 70/14, 57, 58

(56) References Cited

U.S. PATENT DOCUMENTS 5,050,836 9/1991 Makous .......... 248/553
5,520,031 * 5/1996 Davidge .......... 70/58 X
5,579,657 * 12/1996 Makous .......... 70/58 X
5,608,605 * 3/1997 Siow et al. .......... 70/58 X
5,884,508 * 3/1999 Dwight .......... 70/58 X

* cited by examiner

*Primary Examiner*—Ramon O. Ramirez
(74) *Attorney, Agent, or Firm*—Knobbe, Martens, Olson & Bear, LLP

(57) ABSTRACT

An elastomeric mounting pad is adhered to a curved surface of a portable device. Embedded in the mounting pad is a flat piece of metal having a boss extending outside the mounting pad. One end of a fastener is connected to the boss with the other end of the fastener adapted to be connected to an non-portable object to prevent theft of the portable device.

39 Claims, 10 Drawing Sheets

CONFORMAL SECURITY DEVICE

BACKGROUND OF THE INVENTION

1. Field of the Invention

This invention relates to security devices attached to portable devices, especially portable electronic devices such as personal computers and associated hardware.

2. Description of the Related Art

Personal computers and associated peripheral equipment such as scanners, printers, document readers, etc., are sufficiently portable so that a person can carry them. Because these portable items are also valuable, as well as portable, they may be easily stolen. A number of security devices have thus been created to inhibit theft of not only the computers, but variety of portable devices which are valuable yet may be carried off by a single person. One common way of inhibiting this theft is to physically connect the portable device to a non-portable object which is too difficult for one or two persons to easily remove, thus frustrating the theft by making it too difficult to remove the connected portable and non-portable objects, or by making it too difficult to sever the physical connection between the portable device and the non-portable object.

Some of these security devices include flat, metal plates that have an adhesive on one side to adhere the plate to the side of a computer so that the plate cannot be removed without breaking the housing of the computer or other device. A threaded recess in the plate is used to attach a locking device, such as a cable, that is in turn connected to a large, non-portable structure. To remove the device requires severing the cable, or moving the large structure to which the locking device is connected, or breaking the locking device off the portable device. Each of these impedes theft.

While these security devices work well when properly installed, the rigid plates limit their use. The rigid plates make it difficult to attach the plates to a non-flat surface. An improper attachment of these rigid plates to a non-flat surface makes it easier to remove the plate so that the security device can be uncoupled from the portable device and the device stolen. There is thus a need for a security device suitable for use with not only devices having flat surfaces, but for use with devices where there is no flat surface located.

SUMMARY OF THE INVENTION

A flexible mounting pad is provided with a flat surface. Embedded in the mounting pad, preferably near the flat surface, is an enlarged head, preferably comprising a flat metal plate. A connector can extend from this embedded head to an exterior surface of the mounting pad, with the connector being adapted for connection to a security cable or other security device, which limits the movement of the mounting pad and thus limits movement of the device to which the mounting pad is attached. Preferably, the connector has a head forming a thin disk, about 1 -inch in diameter. A threaded recess can be formed in the head so that a fastener can be removably connected to the head. A weld nut works well.

A conformal security device is thus provided for a portable object. The security device preferably has a flexible, elastomeric mounting pad with a bottom surface, an opposing top surface, and sides defining a periphery of the mounting pad. A base is embedded in the mounting pad and an opening formed in the mounting pad extending from the base to one of the top or sides. Advantageously there is an adhesive on the bottom surface of the mounting pad. Preferably, the base comprises a flat piece of metal with a thicker boss containing a recess, and a fastener is inserted into and engages the recess. A connector is connected to the base and extends through the opening, so the connector can be connected to an object that is not portable.

In one embodiment, the connector comprises a tube having a first opening in a wall of the tube, the opening being large enough to pass a head of a fastener, and a second, smaller opening extending through the wall of the tube opposite the first opening. The fastener extends through the opening to engage the recess, the fastener head not passing through the second opening and instead abutting the wall opposite the first opening. A security cable passes through the tube and blocks access to the fastener head.

One important advantage of this invention is that the portable device can have a non-flat exterior surface on which the bottom of the mounting pad is placed, with the mounting pad being flexible enough to conform to the exterior surface of the electronic device, and with the adhesive interposed between the bottom of the mounting pad and the surface to fasten the mounting pad to the exterior surface.

In a further embodiment, the mounting pad comprises a plurality of strands embedded in the mounting pad. The strands can be fastened to a connector configured to be connected to an object that is not portable, or alternatively, the strands can be connected to a security cable of sufficient length to be connected to an object that is not portable.

There is thus advantageously provided a flexible mounting pad having base means inside the mounting pad for preventing removal of said base means from the mounting pad and connector means adapted for connecting the mounting pad to an object outside the mounting pad. The connector means preferably comprises a connector having an enlarged head embedded in the mounting pad and having a connecting portion extending from the mounting pad. Adhesive means on the bottom surface connect the mounting pad to another surface which can be non-flat. Preferably the security device further comprises security restraining means connected to said means inside the mounting pad, the security restraining means being connected to an object that is not portable.

There is further provided means for fastening a first surface of a flexible mounting pad to a surface of the portable device that may be combined with means for securing a connector to a base that is located inside the flexible mounting pad in a way that inhibits removal of the base from the mounting pad. For securement, means are provided for fastening the connector to an non-portable object to limit motion between the portable device and the non-portable object. The securing means preferably comprises a threaded fastener threadingly engaging the base. The base can comprise a solid part, or can comprise a plurality of strands embedded in the mounting pad.

The invention further comprises a method for securing a portable device, and includes the steps of fastening a first surface of a flexible mounting pad to a surface of the portable device by an adhesive, securing a connector to the mounting pad by fastening the connector to a base that is located inside the flexible mounting pad in a way that inhibits removal of the base from the mounting pad, and limiting motion between the portable device and a non-portable object by fastening the connector to the non-portable object. The limiting step can comprise the step of fastening a security cable to a distal end of the connector, and preferably comprises the step of fastening a threaded fastener to the base. Advantageously, the limiting step comprises the step of fastening a security cable to the non-portable object and the mounting pad. If the base comprises a sheet embedded in the mounting pad, then preferably the limiting step comprises the step of extending a connector from the sheet to an exterior of the mounting pad and adapting a distal end of the connector to be connected to the non-portable object.

In an alternative embodiment of the method, the base comprises a plurality of strands embedded in the mounting pad that converge to form a single connection, preferably within the mounting pad, and the motion limiting step comprises the step of extending the strands outside of the mounting pad and securing them to an non-portable object. Alternatively, the base can comprise a sheet embedded in the mounting pad and the securing step comprises the step of forming an engagement with the sheet.

The result of the method and apparatus is a resilient member conforming to the surface of the portable device, and adhered to the portable device by an adhered area sufficient to prevent a thief from pulling the resilient member off the portable device. A base is embedded in the resilient member sufficiently so it resists pulling out of the resilient member if a thief attempts to pull the base out of the resilient member. A connector is fastened to the base, with the connector having a distal end extending outside of the base for securement to a non-portable object. The resilient member is preferably sized to conform to a non-flat contour of the portable device, such a portable electronic equipment.

BRIEF DESCRIPTION OF THE DRAWINGS

These and other objects and advantages of the invention will be better understood with reference to the following description and drawings, in which like numbers refer to like parts throughout.

DETAILED DESCRIPTION OF THE PREFERRED EMBODIMENT

Figure 1:
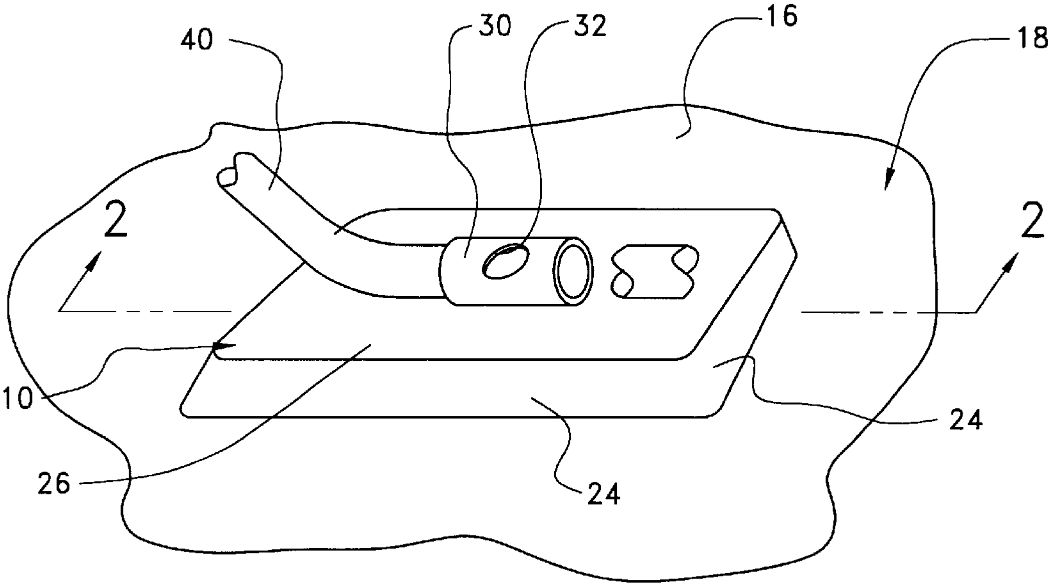
FIG. 1 is a perspective view of the security device of this invention.
Figure 2:
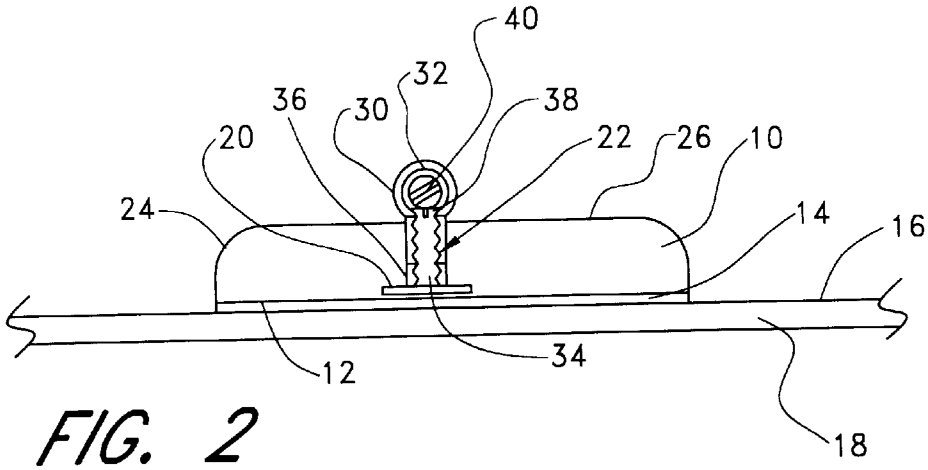
FIG. 2 is a across-sectional view taken along 2—2 of FIG. 1.
Figure 2A:
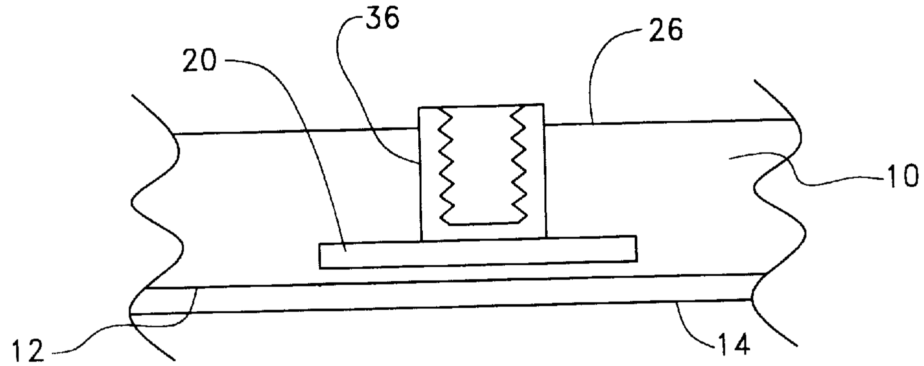

Referring to FIGS. 1 and 2, a flexible mounting pad 10 has a bottom surface 12 to which an adhesive 14 is applied to adhere the mounting pad 10 to a surface 16 of a portable device 18. A base 20 is placed inside the mounting pad 10, preferably by embedding the base 20 in the mounting pad 10. A post or boss 36 extends from the base 20, and preferably extends to outside the mounting pad 10. The mounting pad 10 advantageously has sides 24 defining a periphery of the mounting pad 10, and a top surface 26 opposite the bottom 12. The boss 36 can extend through any of the sides 24 or top 26, but preferably extends through the top surface 26. Advantageously, the base 20 and boss 36 comprise a weld nut, with the enlarged flange being formed by the base 20 and the boss 36 comprising an internally threaded boss 36 mounted to the flange or base 20.

The base 20 is fastened to a restraining device in a variety of ways. One illustrative connection is by a conventional attachment tube which comprises a short length of tube 30 having a hole 32 in one surface through which a connector 22 passes, with the connector 22 comprising a threaded fastener in this instance. The connector 22 has a threaded end 34 that passes through the tube 30 opposite the hole 32 to engage mating threads in a boss 36 on base 20. The connector 22 also has an enlarged head 38 that passes through the hole 32, but not through the wall of the tube 30 opposite the hole 32. Thus, the head 38 screws the tube 30 to the top surface 26 of mounting pad 10. A security cable 40 passes through the tube 30 so that access to the head 38 is prevented, which in turn prevents unscrewing and removing connector 22. The cable 40 is fastened to an object that is not readily movable, such as a desk, wall, floor or post.

In one embodiment the boss 36 terminates inside the mounting pad 10 with an opening to the exterior surface through which a connector 22 can connect to the boss 36 and base 20. But advantageously the boss 36 extends slightly above the adjacent exterior surface of the mounting pad 10 a distance sufficient so the connection with another security device is achieved in a way that makes it more difficult to remove the security device.

For example, if the mounting tube 30 is used and the boss 36 of a weld nut terminates inside the flexible mounting pad 10, then the tube 30 will abut the exterior surface of the mounting pad and that makes it easier to apply a removal force to the weld nut so as to cause the base 20 to be torn from the mounting pad 10, or to bend and break the tube 30 or the connector 22. If the boss 36 extends slightly away from the exterior surface 26, say about 0.060 inches, then the boss 36 holds the tube 30 and security cable slightly off the surface of the mounting pad 10 and a lateral force applied to the tube 30 causes the boss 36 and base 20 to pivot in the elastomeric base 10, allowing the base 10 to absorb and diffuse the applied removal force so as to greatly inhibit forced separation of the connection between the mounting pad 10 and the tube 30. If the boss 36 extends too far above the exterior surface of mounting pad 10, then a lateral force applied to the tube 30 can be applied so as to bend and break the boss 36 or the connector 22, and makes it easier to move the base 20 relative to the mounting pad 10 so as to rip the base 20 from the mounting pad 10.

It is believed advantageous to have the boss 36 end a distance of about 0.060 inches from the adjacent exterior surface of mounting pad 10 when a 0.75 inch diameter, 8–32 weld nut is used in a mounting pad 10 about 0.25 inches thick. Terminating the boss 36 between about 0.010 and 0.030 inches above the surface is possible in a less preferred embodiment, but less desirable as it is not believed to work as well. The exact distance can vary depending on the materials used and the manner of connecting to the base 20 in the mounting pad 10.

The mounting pad 10 is flexible. Preferably it is made of an elastomer, such as rubber or neoprene, with a durometer of 60 shore, but could be made of other flexible materials, or of inflexible materials that are joined to provide flexibility along at least one dimension of the mounting pad 10. Depending on the flexibility and strength of the elastomer, the dimensions will vary. The thickness must be such that the bottom surface 12 can conform to the surface 16 to which the mounting pad 10 is to be attached, and depending on the stiffness of the material, different thicknesses may be needed to achieve the desired flexibility. But the location of base 20 in the mounting pad 10 must also be such that the base 20 does not pull out of the mounting pad 10. The edges of the pad 10 are preferably rounded or inclined sufficiently to make it difficult to grip and attempt to tear the pad 10 off the surface to which it is adhered. A radius corresponding to the thickness is believed advantageous. Thus, for a mounting pad 10 that is about 0.25 inches thick, edges with a radius of about 0.25 inches are believed suitable.

To increase flexibility while reducing pull-out, the base 20 is preferably placed adjacent the bottom surface 12 when the boss 36 extends from the top surface 26. Preferably the base 20 is parallel to the bottom surface 12. Basically, the distance between the base 20 and the surface that the boss 36 exits from, is the portion of the mounting pad 10 that resists the boss 36 from being pulled out of the mounting pad 10. In order to reduce the thickness of the mounting pad 10 and increase flexibility, while also providing the greatest resistance to pull-out of the connector 22, the connector mounting pad should be thin. Thus, thin connector mounting pads 20 are preferred, but they have to be thick enough to resist pulling the base 20 out of the mounting pad. For a 0.25 inch thick elastomeric mounting pad 10, a distance of about 0.19 inches from the base 20 to the exterior surface 26 is believed suitable.

It is possible to form a recess in mounting pad 10 adjacent the bottom surface 12 and insert the base 20 into the recess. But preferably the base 20 is molded into the mounting pad 10 so that it is embedded in the mounting pad and has some of the elastomer between the base 20 and the exterior surface opposing the boss 36. Thus, preferably the elastomer surrounds all sides of the base 29, as well as surrounding all sides of the boss 36 (except for the part that extends above the elastomer surface to connect to the security cables etc.

The layer of elastomer between the base 20 and the adhered surface 12 helps absorb and disperse the removal force exerted by someone trying to break the connection of the connector 22 and base 20 with the mounting pad 10. If the layer of elastomer is not interposed between the surface 16 and the base 20, then the base 20 can be twisted to make removal more easy than compared to having a layer of elastomer to absorb and disperse the removal force. The layer does not have to be very thick to be effective, with a layer of about 0.030 inches thick being suitable. The A mounting pad 10 using the 3–82 steel weld nut embedded in a 2×3 inch rectangular pad, about ¼ inches thick, made of neoprene, with the base 20 separated from the back surface 12 by a thin layer of elastomer about 0.030 inches thick, is believed suitable. A layer of about 0.015 to 0.050 inches thick between the base 20 and the adhered surface 12 is workable, but less desirable for the above described embodiment. The thicknesses can vary with the specific needs.

Advantageously, the mounting pad 10 has a bottom surface 12 of at least about 3 square inches in area, because for the housings currently used on computers and related equipment, the housing will break before the mounting pad 10 is pulled off the portable device 18. Thus, it is preferable to select the area of the bottom surface 12, and to size the mounting pad 10, such that the device 18 breaks before mounting pad 10 or the adhesive layer 14 breaks.

The adhesive material 14 is thus also preferably selected so that the adhesive 14 does not separate under an applied load. Rather, the strength of the adhesive material 14 is preferably selected such that the device 18 breaks or a portion of the surface 16 pulls away with the adhesive 14.

As used herein, the reference to an adhesive 14 includes glues, epoxies, adhesives, adhesive tape, and other chemical fastening compounds. A "super glue" type of adhesive is preferred, generically known as cyanoacrylate. This is a form of super glue that sets quickly. A two-sided adhesive tape could also be used for adhesive 14.

To ensure good adhesion between the mounting pad 10 and the surface 16 to which the mounting pad is fastened, the surface 16 is advantageously clean and slightly roughened. Cleaning with a cleaner or solvent after slightly roughening the surface with sandpaper is preferred. Alcohol can be used as a suitable cleaner for many applications, especially as it evaporates fast. A 200 grit sandpaper can be used to roughen the surface 16.

After applying a coating of this adhesive, the mounting pad 10 must be applied in about 6 seconds or else the "super glue" adhesive cures and reduces the bonding strength. But because this super glue sets quickly it makes installation easier. Other adhesives can be used, with the surface area of the bottom 12, and the installation time, varying accordingly.

The base 20 may be of various sizes and thicknesses, depending in part on the curvature of the surface 16 that must be accommodated by the mounting pad 10. The smaller the base 20 the larger the variation in the contour of the surface 16 that may be accommodated. Conversely, the larger the base 20, the smaller the variation in surface contour that may be accommodated. But as the base 20 is made smaller, it also pulls out of the mounting pad 10 easier. Thus, there is a trade-off among the size of the base 20, the amount of surface variation that may be accommodated, and the thickness of the base 20 resisting pullout of the base 20.

Further, the shape of the mounting pad can affect the accommodated surface variation. A long, rectangular base 20 can accommodate more surface variation along the short dimension compared to the longer dimension. A circular shaped base 20 works equally well no matter what the orientation. Further, a circular base 20 has rounded corners which avoids stress concentrations that could initiate tearing of the elastomeric base 20. If non-circular shapes are used for base 20, the corners are preferably rounded in order to avoid cutting and tearing the elastomeric mounting pad 10. The bases 20 may be embedded in mounting pads 10 of corresponding shape, or of various shapes, including square, rectangular and circular pads 10.

For the above-described mounting pad 10, a base 20 about 0.030 inch thick, and having a circular shape about 0.75 inch in diameter is believed suitable. The thin base 20 allows the base 20 to flex slightly with the elastomeric base, while providing enough strength to diffuse large forces from the boss 36 through the base 20 into the mounting base 10. If the base 20 is too thick or rigid, then it more readily tears out of the mounting base 10. A thickness about 1/25 the diameter of the metal base 20 is believed suitable for use with a 0.23 inch diameter boss 36. Thickness to diameter ratios of as low as 1/50 to as high as 1/15 being believed desirable for steel weld nuts, but less preferable. Other variations are possible as a trade off among flexibility and pull-out strength can be determined given the present disclosure.

Figure 3:
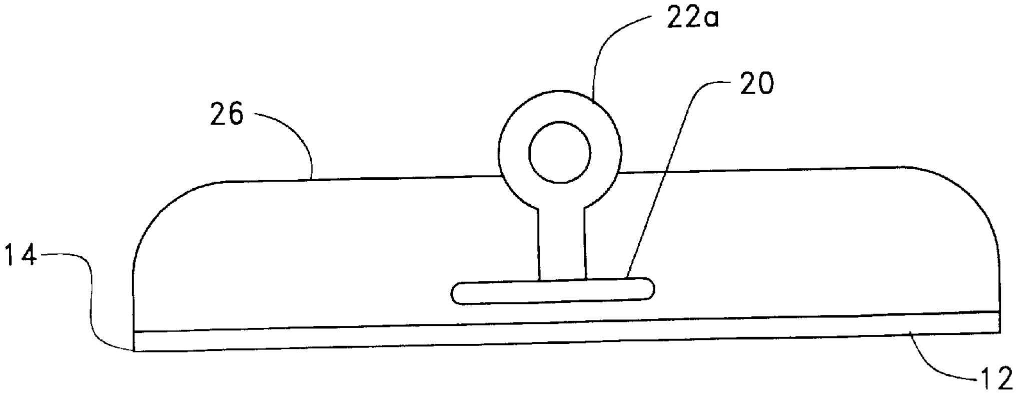
FIG. 3 is a cross sectional view of an alternative embodiment of FIG. 1.

The connector 22 is also selected so that it is strong enough not to break if a thief attempts to pull the mounting pad 10 off the device 18. Because the connector 22 is connected to a thinner connector mounting pad 12, it may be advantageous to provide a thickened area such as boss 36 to connect to the connector 22. This is especially so if the connector 22 is a removable connector, such as a threaded fastener. A boss 36 about 1/4 inch diameter and 1 inch high, used with a steel screw about 3/16 inch in diameter and 1/2 inch long, is believed suitable for the above-described preferred embodiment. As shown in FIG. 3, a single piece of metal can be used to form the connector and base 20 resulting in an integral boss 36*a* and base 20.

Figure 4:
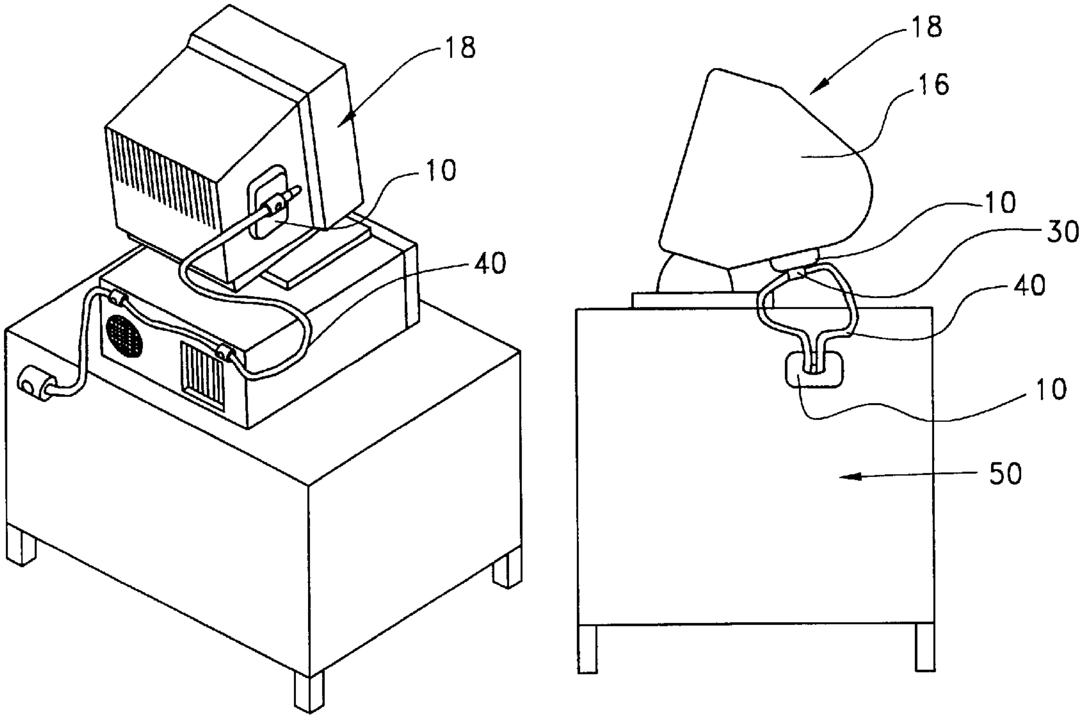
FIG. 4 is a side view of the security device of FIG. 1 fastened to a computer desk.

Referring to FIGS. 1–2 and 4, the use of the security device is described. An adhesive 14 is applied to the bottom 12 of the mounting pad 10. The mounting pad 10 is fastened to the device 18, shown as a personal computer, so that a desired bond strength is achieved between the adhesive 14 and device 18. If super glue is applied, the mounting pad 10 should be pressed against the surface 16 of device 18 within about six seconds after applying the super glue 14. The mounting pad 10 is flexible and will conform to the surface 16, including curves. After the adhesive is cured sufficiently to prevent removal of the mounting pad 10, the mounting pad 10 may be secured to a non-portable object. As used herein, a non-portable object includes stationary objects like walls, posts and floors, as well as objects that are difficult for one or two persons to readily move, such as desks, large tables, large pieces of furniture, file cabinets, etc. The illustrated embodiment has a security cable 40 connected to the mounting pad 10 either through the tube 30 (FIG. 1), through an eye of a connector 22 (FIG. 3). A second flexible mounting pad 10 is fastened to the side of a desk 50 and connected to the cable 40 to tie the computer 18 to the desk 50.

Figure 9:
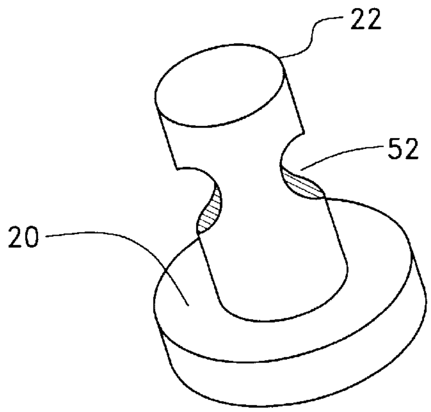
FIG. 9 is a perspective view of a further embodiment of a connector of this invention.
Figure 10:
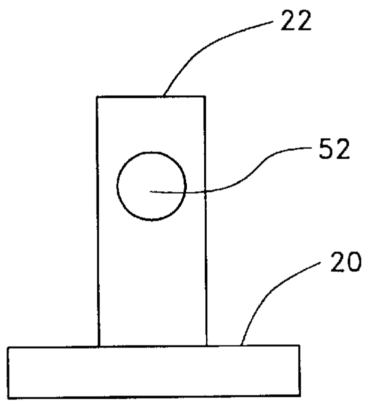
FIG. 10 is a side view of the connector of FIG. 9.
Figure 11:
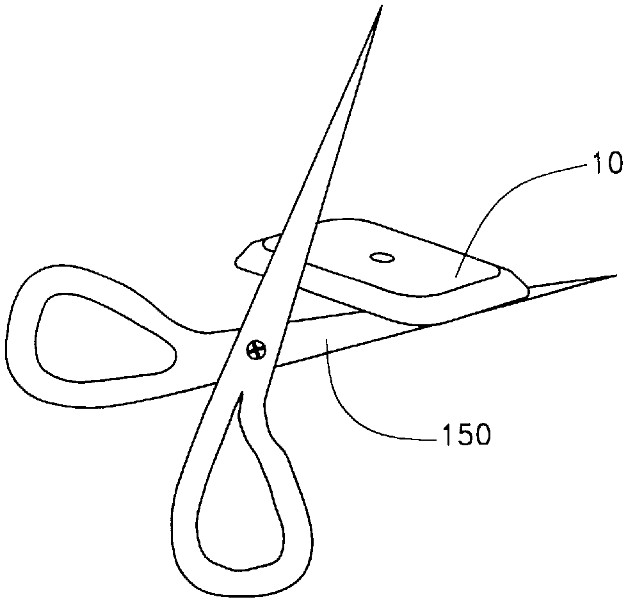
FIG. 11 is perspective view of a mounting pad of this invention being trimmed to size and shape.
Figure 12:
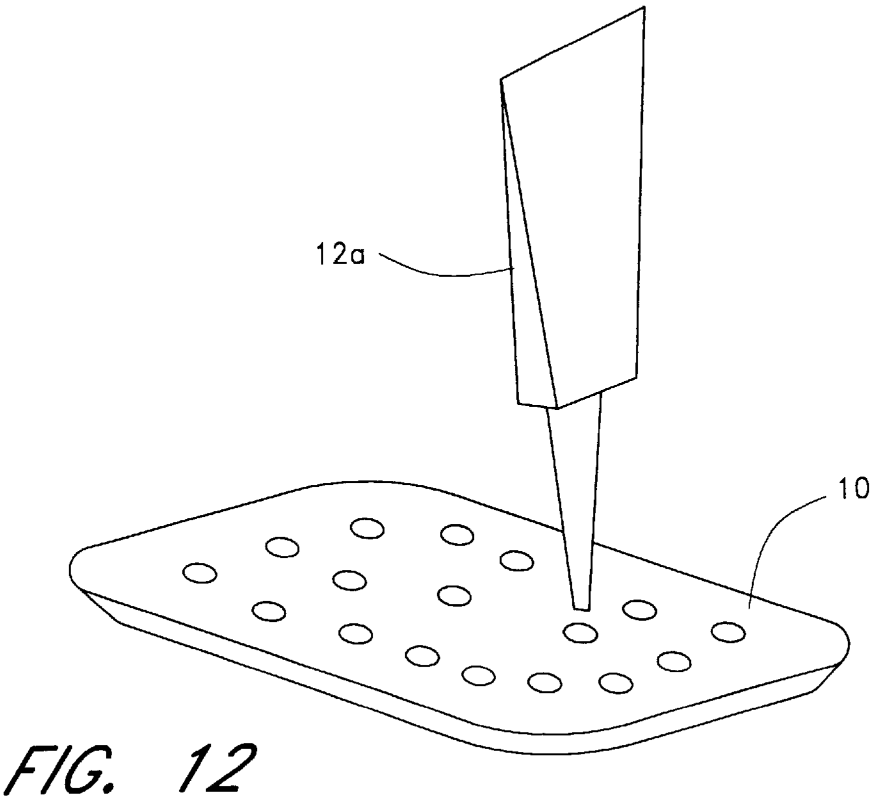
FIG. 12 is a perspective view of an adhesive being applied to a mounting pad of this invention.

Other connectors 22 can be used, and other ways of fastening the non-portable objects to the base 20 can be used. For example, FIGS. 9–10 show a further embodiment of the connector 22 in which the connector 22 comprises a cylindrical post extending from the base 20. The distal end of the connector 22 has a hole 52 formed therein, with the hole being used to connect the connector 22 to a non-portable object. The base 20 is embedded in the mounting pad 10 (FIG. 1) as in prior embodiments.

In addition to providing the ability to connect to devices in areas that are not flat, the present device offers an additional advantage. When rigid connectors are used and someone attempts to remove them by force, the rigid mounting pad directly transmits the force to the housing to which the rigid connector is fastened. This rigid connector also provides a stress concentration at the edge of the rigid connector. The result is applying a force to the rigid connector typically breaks the housing at the edge of the rigid connector. With the flexible mounting pad 10, the elastomeic mounting pad 10 acts as an energy absorber, akin to a large spring. The removal energy stretches or compresses the elastomeric mounting pad 10 and absorbs a large amount of removal energy without damaging the device 18. Further, the elastomer is flexible and does not transmit the removal forces to a concentrated location, but instead distributes them over the flexible mounting pad 10. The result is that when forced removal is attempted, the mounting pad 10 will flex and not break, and the surface 16 to which the mounting pad 10 is attached is at least partially shielded from damage. It takes much more force to break the housing of the device 18 if a flexible mounting pad 10 is used compared to a rigid, conventional connector of the same size.

The mounting pad 10 is connected to a security cable or other security device by a connection embedded inside the mounting pad. This contrasts to the prior art in which the connections were to a rigid plate, even if the rigid plate was in turn connected to an elastomeric layer.

Figure 5:
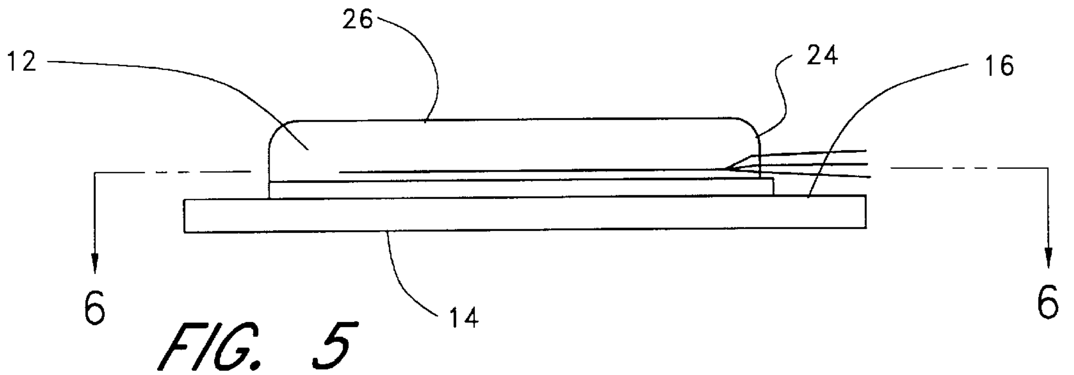
FIG. 5 is a cross-sectional view of an alternative embodiment taken along 5—5 of FIG. 6 is a cross-sectional view taken along 6—6 of FIG. 5.
Figure 6:
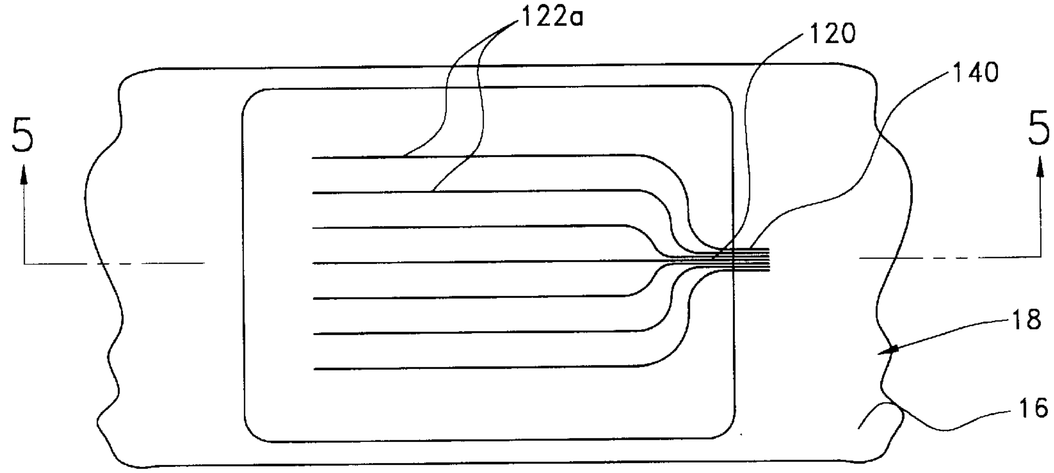
Figure 7:
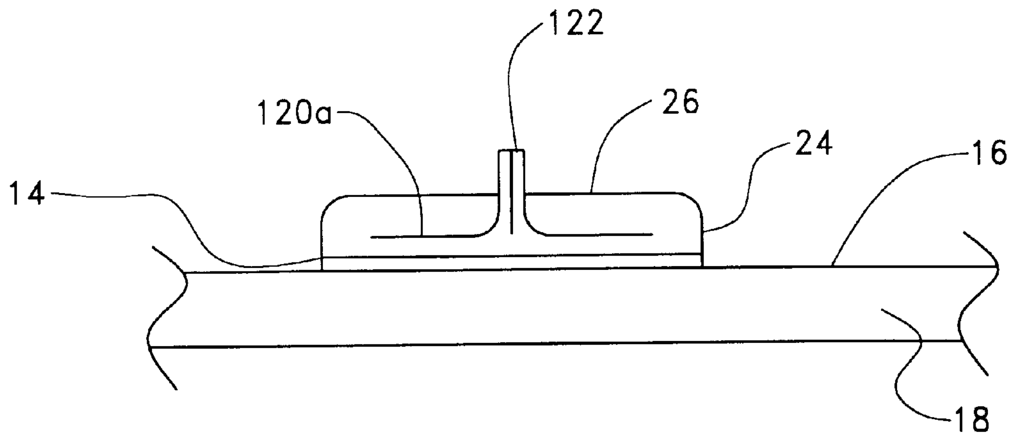
FIG. 7 is a cross-sectional view of the embodiment of FIG. 8.
Figure 8:
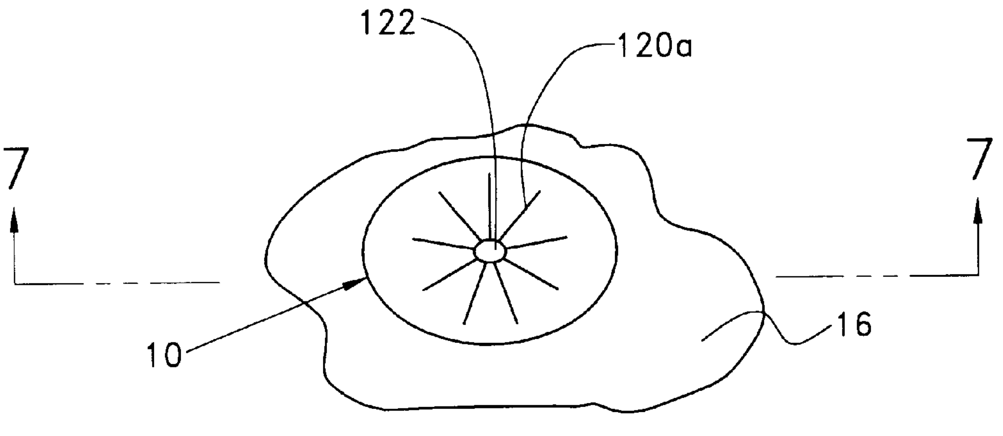
Fig. 8 is a top view of a further embodiment of this invention.

A further embodiment of this invention is shown in FIGS. 5–6. The mounting pad 120 comprises a plurality of strands 120*a* which are embedded in the elastomeric mounting pad 10, along a length of the mounting pad, generally parallel to the flat bottom surface 12. An adhesive 14 fastens the mounting pad 10 to the surface 16 of device 18. The plurality of strands 120*a* are dispersed over the width of the mounting pad 10, with the strands converging toward one side 24 of the mounting pad 10 and being wound into a connector 120 which can comprise any of the connectors 20 discussed above, or other connectors known to those skilled in the art. But preferably, the connector 120 comprises the distal end of a security cable 140. This resembles a frayed cord in which the frayed strands 120*a* are embedded in the elastomer mounting pad 10, with the cords joining the cord so that the cord forms connector 120 and exits out of a side 24 of the mounting pad 10. A similar construction could be used with the cord or connector exiting out of the top surface 26 as shown in FIGS. 7–8, in which the strands are dispersed in a radial pattern for embedding in the elastomeric base 10, and exiting out the top surface. In both of these alternative embodiments, the strands 120*a* are preferably metal, such as steel and form a woven security cable 120. The prior art is believed to have used metal cables connected to rigid plates that were in turn fastened to the portable devices, but the cables were not embedded in flexible elastomers as described herein.

The base 20, 120, and connectors 22, 122, thus advantageously provid a means for securing a flexible mounting pad 10 to a non-portable device, whether the securement is directly achieved, or by intermediate devices such as security cable 40. Additional securement mechanisms and methods are described below.

Referring to FIGS. 11–15, more than one mounting pad 10 may be used to secure portable device 18. A plurality of mounting pads 10 may be cut to a suitable size or shape, as for example, by scissors 150, in order to fit the areas to which the mounting pad 10 is to be connected. The areas are slightly roughened and cleaned. The adhesive 12 is applied from a tube 12*a* to the bottom 12, which is shown as having recesses to increase the surface contact with the adhesive. Alternatively, the adhesive can be activated by the removal of a protective strip if a two-sided adhesive is on the bottom surface 12. The mounting pad 10 is then adhered to the selected and prepared area, and held in place as long as needed to bond.

Figure 13:
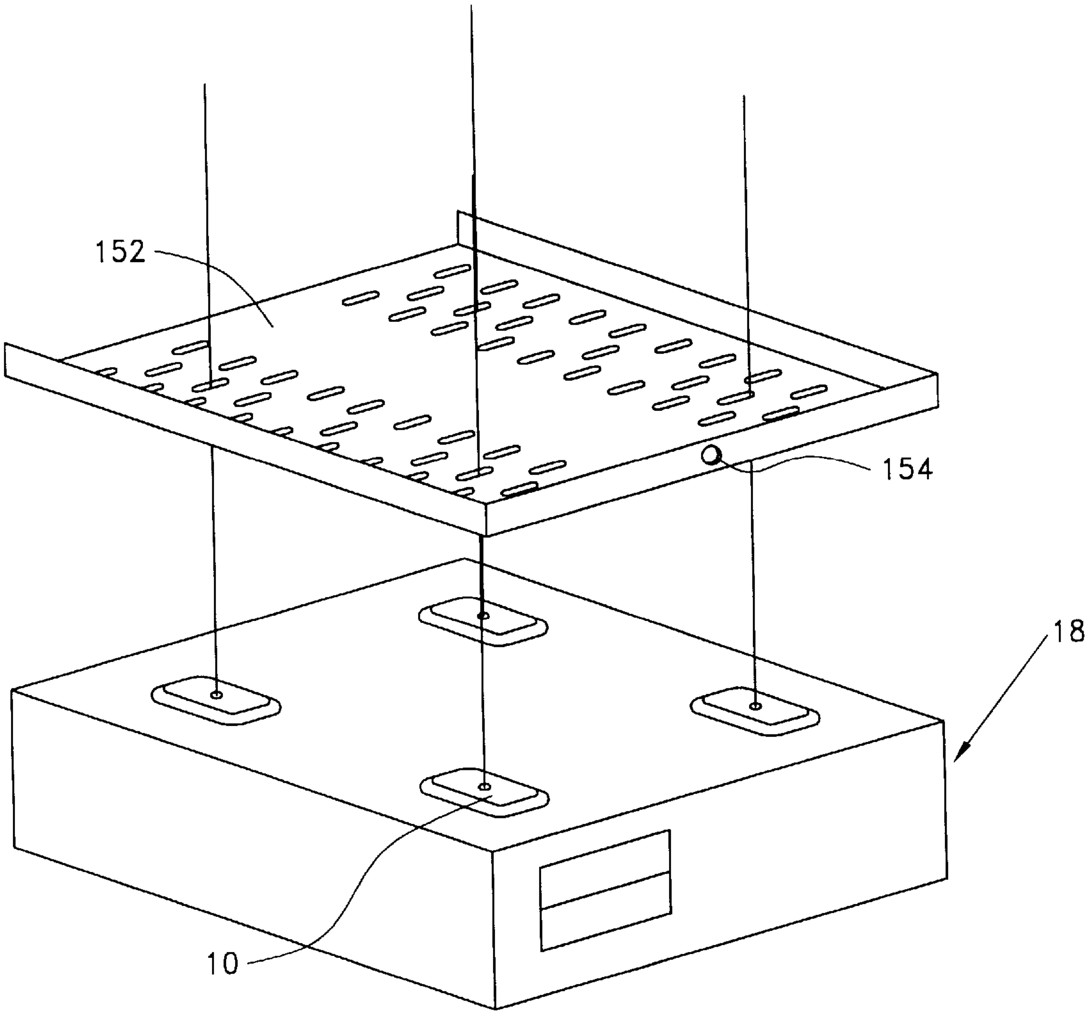
FIG. 13 is an exploded perspective view of a mounting interface being fastened to plural mounting pads of this invention.

In the embodiment of FIG. 13, four flexible mounting pads 10 are used, with one mounting pad being placed at each comer of the bottom surface of a portable electronic device 18. The mounting pads 10 are accessible through holes in the interface 152. The mounting interface 152 comprises a flat, rectangular sheet that has a key lock 154 on it.

Figure 14:
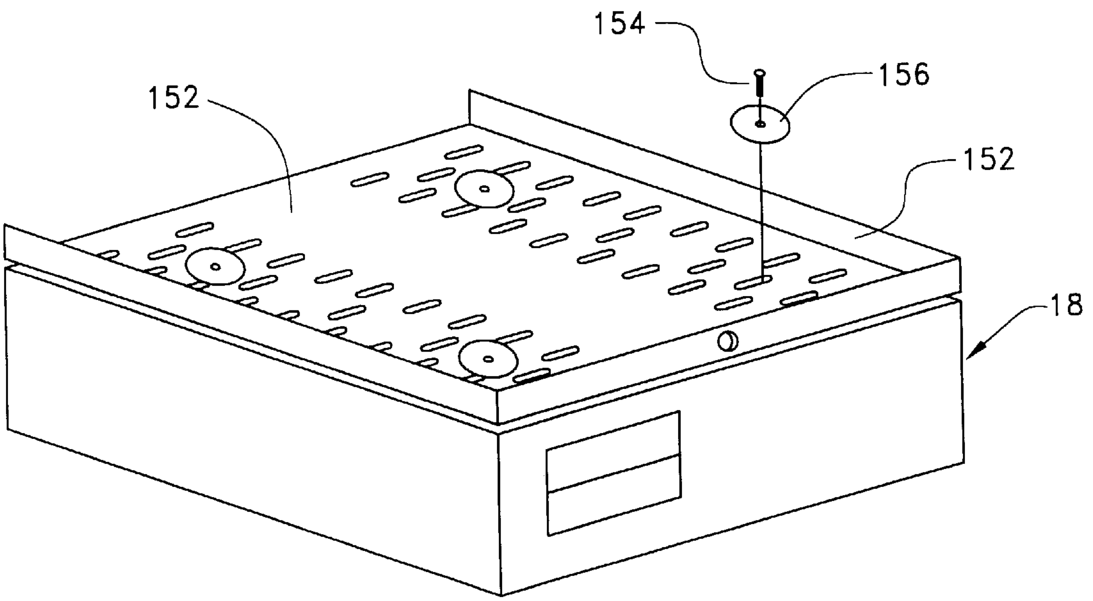
FIG. 14 is a perspective view of the mounting interface being fastened to a portable device.
Figure 15:
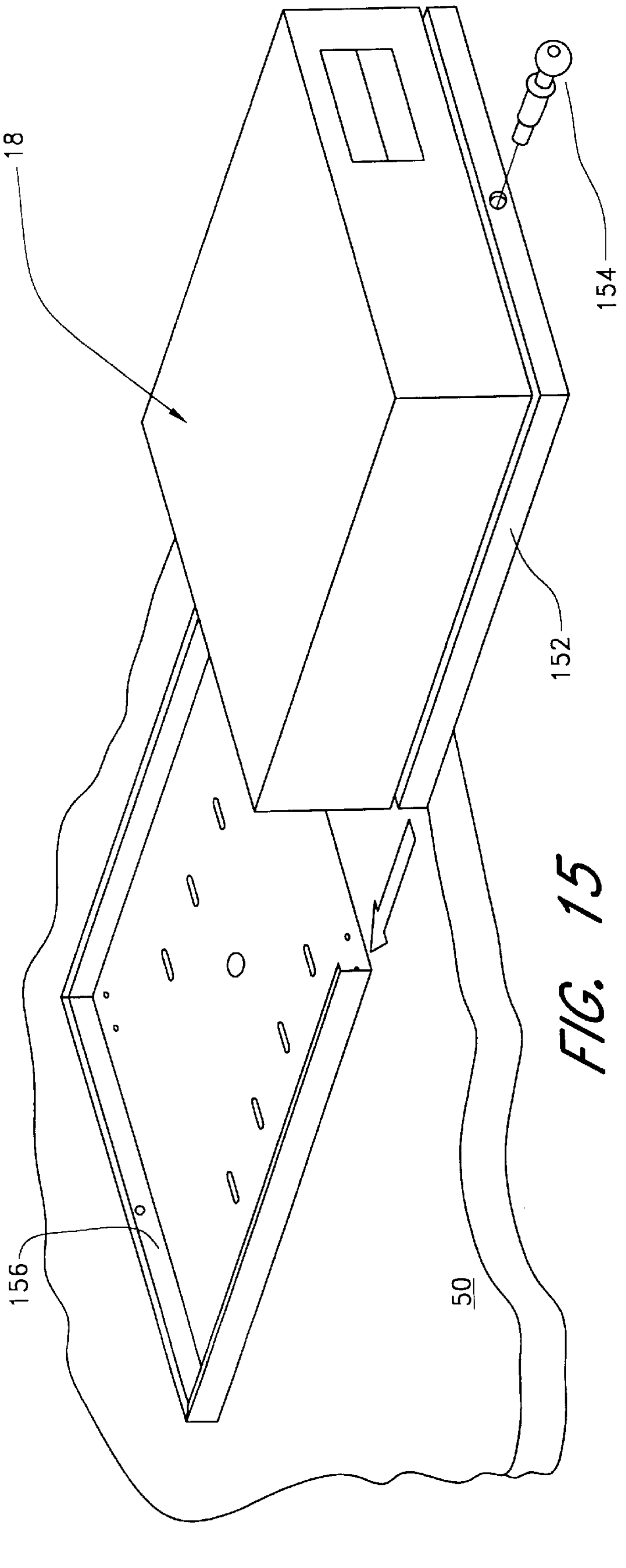
FIG. 15 is a perspective view of a portable device being connected to a mounting pad.

The mounting pads 10 are then fastened to the mounting interface 152. This can be achieved as shown in FIG. 14, by inserting connectors 22 in the form of threaded fasteners 154 through the interface 152 to screw into the base 20 (FIG. 2) of each mounting pad 10. Washers 156 can be interposed between the fasteners 154 and the interface 152 as desired. Alternatively, connectors 22 of each mounting pad 10 could extend through mounting interface 152 with nuts placed on the distal ends of the connectors to fasten the mounting pad 10 to the mounting interface.

Referring to FIG. 14, the mounting interface 152 is then connected to a mounting pad 156 that is secured to a non-portable object 50, such as a desk, by various means known in the art, including, but not limited to adhesives and threaded fasteners such as nuts, bolts and screws. The lock mechanism 154 secures the portable device 18 to the non-portable object 50, with the mounting interface 152 and the mounting pad 156 cooperating to prevent ready access to the mounting pads 10 that connect the portable device 18 to the non-portable object 50.

Given the above disclosure, one skilled in the art will be able to make further variations that are within the spirit and scope of this invention. Thus, the above disclosure is given by way of illustration and not limitation. In particular, the above description discloses several features and several embodiments, and each may be used advantageously by itself, or in combination with one or more of the other features or embodiments disclosed herein.

What is claimed is:

1. A conformal security device for securing a portable object to a non-portable object, comprising:

a flexible, elastomeric mounting pad having a bottom surface, an opposing top surface, and sides defining a periphery of the mounting pad, wherein the mounting pad is flexible enough to conform to a non-planar surface of the portable object or the non-portable object; and a base embedded in the mounting pad and an opening in the mounting pad extending from the base to one of the top or sides of sufficient size to permit a structural connection to the base to be achieved.

2. A conformal security device as defined in claim 1, further comprising an adhesive on the bottom surface of the mounting pad.

3. A conformal security device as defined in claim 2, wherein the base comprises a flat piece of metal having a thicker boss containing a recess.

4. A conformal security device as defined in claim 2, wherein the base comprises a flat piece of metal having a thicker boss containing a recess with the boss extending slightly above the top surface.

5. A conformal security device as defined in claim 4, further comprising a fastener inserted into and engaging the boss.

6. A conformal security device as defined in claim 2, wherein the base comprises a plurality of strands embedded in the mounting pad.

7. A conformal security device as defined in claim 5, wherein the strands are connected to a security cable of sufficient length to be connected to an object that is not portable.

8. A conformal security device as defined in claim 2, further comprising a portable electronic device having a non-flat exterior surface on which the bottom is placed so as to conform to the exterior surface of the electronic device, and the adhesive is interposed between the bottom of the mounting pad and the surface to fasten the mounting pad to the exterior surface.

9. A conformal security device as defined in claim 2, further comprising a connector connected to the base and extending through the opening, the connector being configured to be connected to an object that is not portable.

10. A conformal security device as defined in claim 2, further comprising a connector connected to the base, the connector being configured to be connected to an object that is not portable.

11. A conformal security device as defined in claim 2, further comprising a connector connected to the base and extending through the opening, and a security cable connected to the connector.

12. A conformal security device as defined in claim 2, wherein the area of the mounting pad is at least three square inches.

13. A conformal security device as defined in claim 1, wherein the base comprises a flat piece of metal having a thicker boss containing a recess.

14. A conformal security device as defined in claim 1, further comprising a connector connected to the base and extending through the opening, and a security cable connected to the connector, the cable being connected to an object that is not portable.

15. A conformal security device as defined in claim 4, further comprising a connector connected to the boss, the connector being connected to an object that is not portable.

16. A conformal security device as defined in claim 15, wherein the connector comprises a tube having a first opening in a wall of the tube, the opening being large enough to pass a head of the fastener, a second, smaller opening opposite the fastener extending through the wall of the tube opposite the first opening, the fastener extending through the openings to engage the recess, the fastener head not passing through the second opening but abutting the wall opposite the first opening.

17. A conformal security device as defined in claim 16, further comprising a security cable passing through the tube and blocking access to the fastener head.

18. A conformal security device as defined in claim 1, wherein the area of the mounting pad is at least three square inches.

19. A conformal security device, comprising:

a flexible mounting pad comprised of an elastomeric material, wherein the mounting pad has a top surface and a bottom surface;

a base embedded in and surrounded by the elastomeric material of the mounting pad; and a connector having one end connected to the base and having another end extending from the base to a point slightly above the top surface of the mounting pad, such that the elastomeric material of the mounting pad is adapted to absorb and diffuse a removal force applied to the connector.

20. A security device as defined in claim 19, wherein the base means comprises a weld nut having an enlarged head embedded in the mounting pad and a boss extending from the mounting pad a distance sufficient to inhibit forced separation of the weld nut from the mounting pad.

21. A security device as defined in claim 19, further comprising adhesive means on the bottom surface for connecting the mounting pad to another surface.

22. A security device as defmed in claim 19, further comprising security restraining means connected to said base means for connecting to an object that is not portable.

23. A method for securing a portable device, comprising:

fastening a first surface of a flexible mounting pad to a non-planar surface of the portable device, such that the mounting pad conforms to the shape of the non-planar surface;

securing a connector to the mounting pad by fastening the connector to a base that is located inside the flexible mounting pad in a way that allows the flexibility of the mounting pad to absorb force and inhibit removal of the base from the mounting pad; and limiting motion between the portable device and a non-portable object by fastening the connector to the non-portable object.

24. A method as defined in claim 23, wherein the limiting step comprises the step of fastening a security cable to a distal end of the connector.

25. A method as defined in claim 23, wherein the securing step comprises the step of fastening a threaded fastener to the base.

26. A method as defined in claim 23, wherein the limiting step comprises the step of fastening a security cable to the non-portable object and the base.

27. A method as defmed in claim 23, wherein the base comprises a plurality of strands embedded in the mounting pad, and wherein the motion limiting step comprises the step of extending the strands outside of the mounting pad and securing them to an non-portable object.

28. A method as defined in claim 23, wherein the base comprises a sheet embedded in the mounting pad and the securing step comprises the step of forming a threaded engagement with the sheet.

29. A method as defined in claim 23, wherein the base comprises a sheet embedded in the mounting pad and the securing step comprises the step of extending a connector from the sheet to an exterior of the mounting pad and adapting a distal end of the connector to be connected to the non-portable object.

30. A method for securing a portable device, comprising:

fastening a first surface of a flexible mounting pad to a surface of the portable device, wherein the mounting pad is comprised of a flexible, elastomeric material;

connecting a connector to a base that is located inside and surrounded by the elastomeric material of the flexible mounting pad in a way that inhibits removal of the base from the mounting pad; and fastening the connector to a non-portable object to limit motion between the portable device and the non-portable object.

31. A method as defined in claim 30, wherein the connecting step comprises the step of threadingly engaging a threaded fastener with the base.

32. A method as defined in claim 30, wherein base comprises a plurality of strands embedded in the mounting pad and the connecting step comprises the step of connecting to the strands at a single location.

33. A security device for connecting a portable device to a non-portable object, comprising:

a mounting pad comprised of a flexible, resilient material adhered to the portable device by an adhered area sufficient to prevent pulling the mounting pad off the portable device; and a weld nut having a base embedded in and surrounded by the resilient material sufficiently so the weld nut resists pulling out of the mounting pad by the manual application of a removal force, the resilient material acting to absorb and disperse the removal force to inhibit damage to the portable device.

34. A security device as defined in claim 33, further comprising a security cable connected to the weld nut.

35. A security device as defined in claim 34, further comprising a non-portable object connected to the connector.

36. A security device as defined in claim 33, wherein the resilient member is sized have sufficient flexibility to conform to a non-flat contour of the portable device.

37. A method of securing a portable device, comprising:

providing a mounting pad made of a flexible, elastomeric material, wherein the mounting pad has a top surface, a bottom surface, a base embedded within the material of the mounting pad, and a connector having one end connected to the base and another end extending to at least the top surface of the mounting pad;

trimming the mounting pad to a suitable size and shape to permit attachment of the mounting pad to a surface of the portable device;

attaching the bottom surface of the mounting pad to a surface of the portable device; and attaching the connector to a non-portable object.

38. The method of claim 37, wherein trimming the mounting pad comprises cutting the elastomeric material with scissors.

39. A conformal security device for securing a portable object to a nonportable object, comprising:

a flexible, elastomeric mounting pad having a bottom surface, an opposing top surface, and sides defining a periphery of the mounting pad;

a base embedded in the mounting pad and an opening in the mounting pad extending from the base to one of the top or sides of sufficient size to permit a structural connection to the base to be achieved; and a connector connected to the base and extending through the opening, wherein the the connector is adapted to be connected to the non-portable object by a security cable.

* * * * *